United States Patent

[19]

Fleming

[11] 4,034,716
[45] July 12, 1977

[54] PORTABLE STOCK LOADING CHUTE

[76] Inventor: William E. Fleming, P.O. Box 495, Hastings, Nebr. 68901

[21] Appl. No.: 664,143

[22] Filed: Mar. 5, 1976

[51] Int. Cl.$^2$ .................................... A01K 29/00
[52] U.S. Cl. ......................... 119/82; 14/71.3; 214/85; 296/61
[58] Field of Search ................. 119/82; 193/3, 4, 5, 193/15; 105/436; 14/71.3, 72, 69.5, 71.1; 214/515, 517, 38 CB, 38 D, 85, 85.1, 100, 103, 105, 107; 280/43.24, 5.24, 5.32, 490, 491 F; 182/63, 64, 68

[56] References Cited

U.S. PATENT DOCUMENTS

| 1,345,238 | 6/1920 | Raplee | 119/82 |
| 3,020,882 | 2/1962 | Browning | 119/82 |

*Primary Examiner*—John F. Pitrelli
*Assistant Examiner*—Peter K. Skiff

[57] ABSTRACT

The loading chute is constructed for ease and convenience in setting up for loading or unloading operations and also for ease and convenience in loading on a transporting vehicle for movement between various points of use. It comprises a framework having a forwardly extending base and an elongate ramp pivotally connected at its aft end to the lower aft end of the framework. A tension device, such as a winch and cable, raises the ramp about its pivotal connection to angle up and forward with respect to the base. The latter is somewhat longer than half the length of the ramp to support it in its elevated position when empty. Retractable shanks are lowered to support the front end of the ramp when it is loaded. To move the chute, the ramp is raised to a suitable angle, a truck is backed into position with its load platform under the forward portion of the ramp, and the chute is then tilted forward about the forward end of the base serving as a fulcrum until the ramp rests on the platform. The base is then drawn up so that the fulcrum clears the ground and then drawn up further to cause the base to contact the lower aft end of the vehicle body, such as the rear bumper, to secure the ramp in loaded position.

14 Claims, 7 Drawing Figures

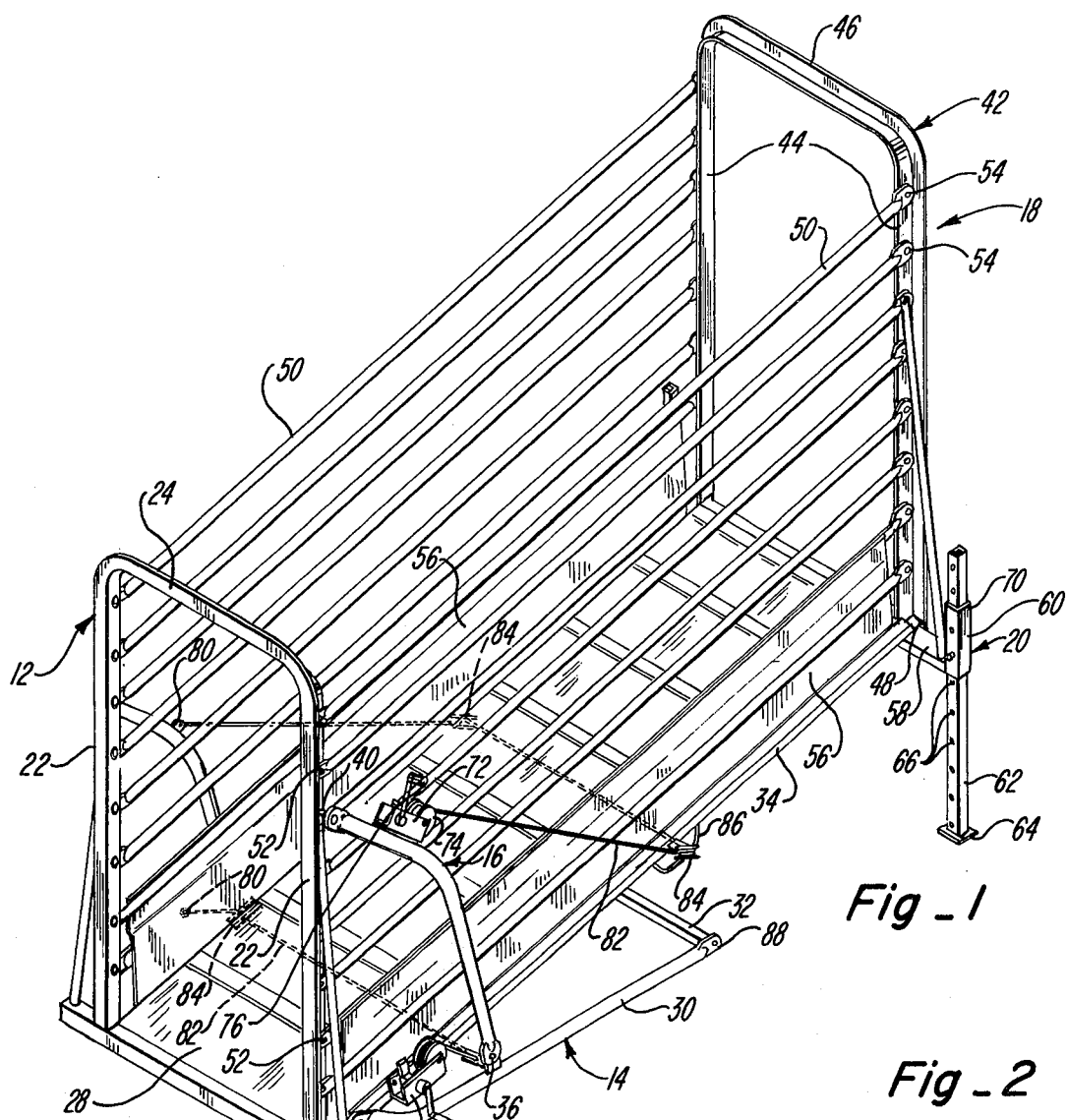
Fig_1
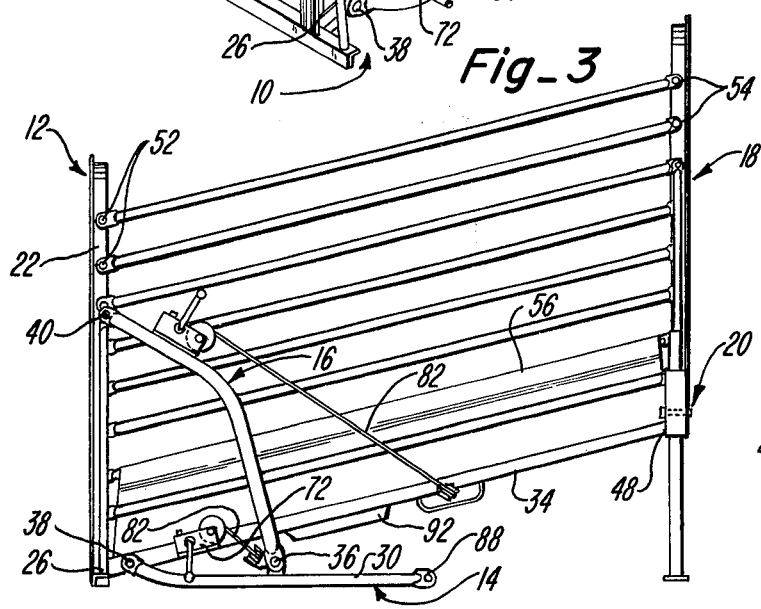
Fig_3
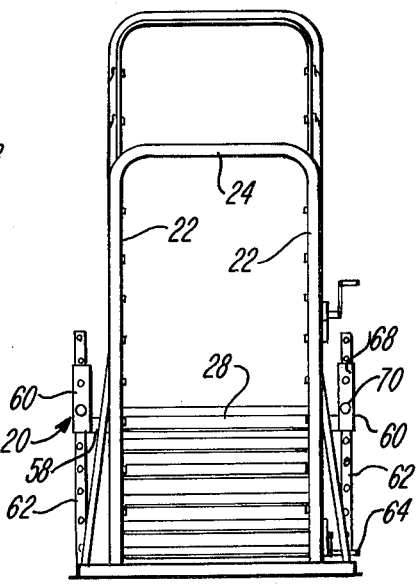
Fig_2

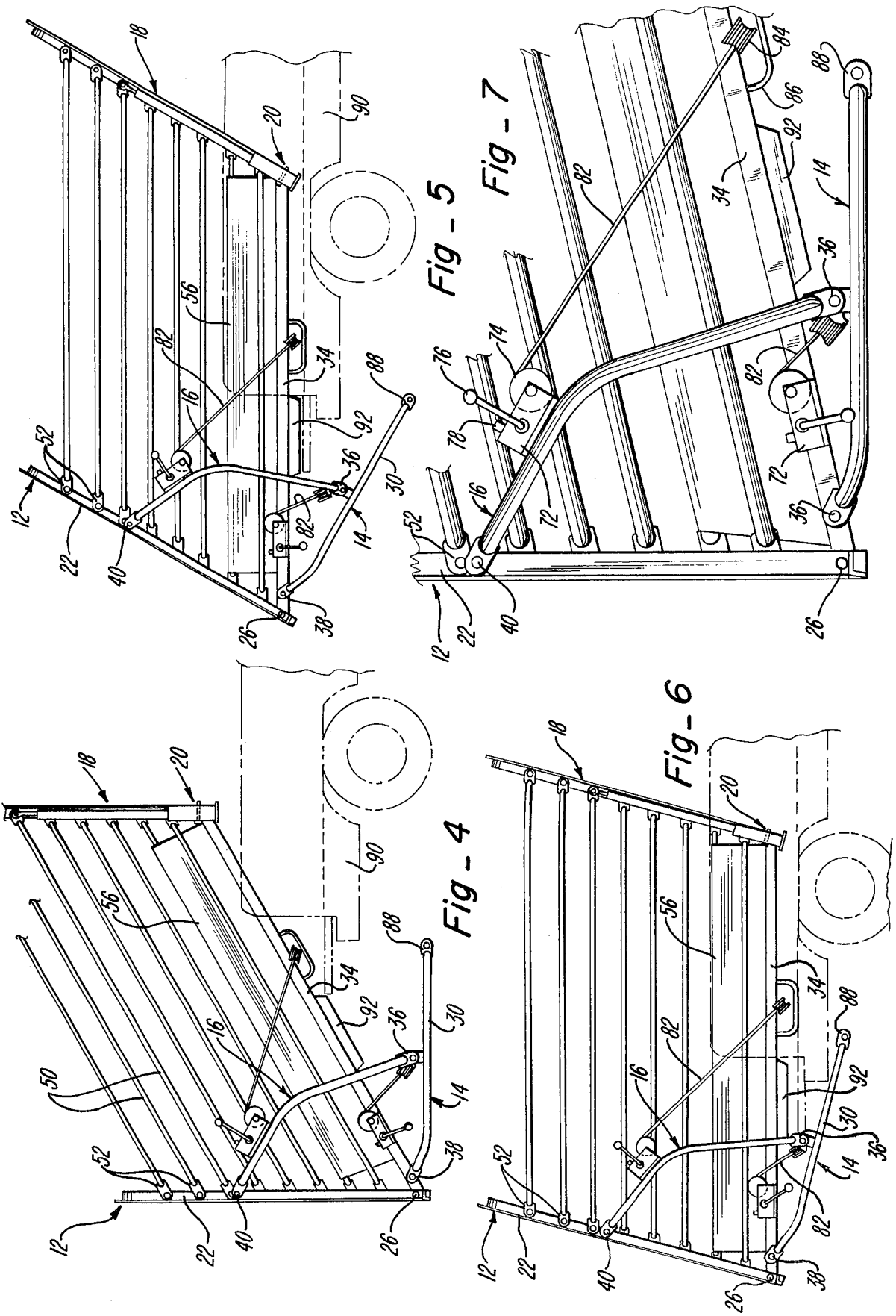

PORTABLE STOCK LOADING CHUTE

BACKGROUND OF THE INVENTION

The apparatus of this invention lies in the field of chutes for loading or unloading cattle or other animals on and off railroad cars, trucks, and the like, and is directed to such chutes which are portable for use in various locations. It is more particularly directed to such chutes which involve a minimum of parts and equipment, are readily adjustable for use with platforms of different heights, and which can be loaded on a truck with minimum manpower and no extraneous equipment.

Many types of loading chutes have been constructed and used over the years and have had various desirable and undesirable features. Conventionally a framework or base is provided and an elongate ramp is pivotally connected at its aft end to the lower rear portion of the framework so that its forward end can be raised to some desired elevation. In some cases the forward end is raised by direct manpower and is then supported by chocks or fixed length jack stands. To reduce the effort, one or more extensible jacks may be connected to the forward end to raise it to the desired height. They may be used for continuing support or replaced by jack stands. The ramp may also be elevated by connecting a cable to a forward portion and a winch to a rear part of the fixed framework, and winding the cable on the winch.

Chutes of these types are basically not portable. It is true that they may be moved short distances for positioning, etc., by simply dragging them along the ground but the range is obviously very limited. To actually move them to a new location it is necessary to use a hoisting vehicle to load them onto a flat bed truck and take the vehicle to the new location or provide a similar vehicle at that location to place the chute back on the ground. This is difficult, time-consuming, and expensive.

There are portable chutes presently in use which are simply provided with a cross axle and wheels so that they are basically trailers. However the flexibility of the tires, and springs if used, makes the chute unstable during loading and unloading. This is overcome by removing the wheels for use and replacing them for transport. Since this takes time and effort, and the equipment adds greatly to the total cost, this is not a satisfactory solution.

SUMMARY OF THE INVENTION

The apparatus and method of the present invention overcome the difficulties mentioned above and provide a system which is simple and completely reliable with no components which are expensive or subject to rapid wear or deterioration and satisfies all the requirements for convenience of use and transportion.

Generally stated, the apparatus of the present invention comprises a substantially rigid framework having an upright frame defining an upright transverse plane and a supporting base lying in a generally horizontal plane extending forward from the lower end of the frame, the latter having a passsageway for the entry of stock. An elongate ramp is pivotally connected at its aft end to the lower end of the frame adjacent to the base and extends forward.

Operating means are provided to raise the ramp to a forwardly and upwardly inclined position when supported by the base and to raise the base upwardly toward the ramp on occasion. The operating means in presently preferred form consists of separate cable and winch mechanisms for each of these functions. The first mechanism preferably comprises a winch mounted on an upper portion of the framework at one side of the ramp, an anchorage mounted on an upper portion of the framework at the other side of the ramp, cable guides at the lower side edges of the ramp well forward of its pivotal mounting, and a flexible cable secured at one end to the mounting, passing over the cable guides, and having its second end wrapped on the winch. Actuation of the winch gradually swings the ramp up to the desired extent and the winch is then latched. To avoid continual strain on the cable and winch during loading and unloading operations, guide sockets are secured at each side of the forward end of the ramp and vertically slidable support shanks are mounted in the sockets. After being lowered into ground contact they are locked in position to serve as jack stands and the winch is released to slacken the cable.

The fore and aft length of the base is somewhat more than half the length of the ramp but is considerably less than the full length of the ramp. Its length is thus sufficient to support the ramp in lowered or elevated position when there is no extra load on the ramp. The jack stands support the forward end for loading or unloading. The forward end of the base constitutes a fulcrum about which the entire chute may be tilted quite easily because it is not far from the midpoint of the chute. When it is desired to transport the chute, a transporting vehicle such as a pickup truck is backed into position with its load bed or platform underlying the forward portion of the ramp. The chute is then tilted forward until the ramp lies on the load bed, and the base is raised to clear the ground.

The second mechanism mentioned above preferably comprises a winch mounted on one longitudinal side edge of the ramp forward of its pivotal mounting and an anchorage correspondingly mounted on the other side, cable guides at the sides of the base intermediate its ends, and a flexible cable secured at one end to the anchorage, passing over the guides, and having its second end wrapped on the winch. When the winch is actuated, it raises the base so that the fulcrum clears the ground. The ramp is then pushed forward onto the load bed as far as possible and the ramp is raised farther until it contacts the lower aft edge of the truck body, usually the bumper, and the winch is latched. The positive contact of the base with the bumper serves to secure the load in place and the chute may now be readily transported to any desired location. Reversal of the procedure just described will place the chute back in operative position at the new location.

While it is preferred to use steel cable in the tension devices, it will be apparent that rope or any other suitable flexible filamentary materials may be substituted if desired.

BRIEF DESCRIPTION OF THE DRAWINGS

Various other advantages and features of novelty will become apparent as the description proceeds in conjunction with the accompanying drawings, in which:

FIG. 1 is a front perspective view of the chute mounted on the ground in operative position;

FIG. 2 is a front elevational view of the chute;

FIG. 3 is a side elevational view of the chute in operative position;

FIG. 4 is a side elevational view of the chute in position for loading onto a transporting vehicle;

FIG. 5 is a side elevational view of the chute in supported position on the vehicle;

FIG. 6 is a view similar to FIG. 5 showing the base elevated; and

FIG. 7 is an enlarged side elevational view of a portion of the chute showing the tension mechanism in more detail.

DESCRIPTION OF PREFERRED EMBODIMENTS

The apparatus of the invention is schematically illustrated in operative position in FIG. 1, in which a substantially rigid framework 10 includes an upright frame 12 and a base 14 connected by a pair of brace bars 16 extending forward and downward. Ramp 18 is pivotally connected at its aft end to the framework and extends forward and upward being supported at its forward end by a pair of jack stands 20. Frame 12 includes a pair of laterally spaced upright bars 22 joined at their upper ends by a cross member 24, together defining an upright transverse plane and providing an open passageway for entry of stock to be loaded. The lower ends of bars 22 are joined by pivot means 26 to the aft end of walkway or platform 28 of the ramp.

Base 14 comprises a pair of generally horizontally extending side bars 30 connected at their forward ends by a cross member 32 defining a fulcrum for a purpose to be described. The aft ends of the bars 30 are pin-connected at 38 to the side rails or edges 34 of ramp platform 28 just forward of the pivot connections 26, while brace bars 16 are pin-connected at 40 to the upper portions of upright bars 22 and to mountings 36 on bars 30 to produce a generally triangularly braced framework.

The detailed construction of the ramp is not material to the invention. A typical form is illustrated in the drawings, in which an exit frame 42 includes upright side bars 44 joined at their upper ends by cross member 46, corresponding to entry frame 12. The lower ends of side bars 44 are pivotally connected at 48 to the forward end of walkway or platform 28, and a plurality of vertically spaced parallel guard rails 50 are pivotally connected at 52 to frame 12 and at 54 to frame 42 at each side of the platform to define a multiple parallelogram linkage which will maintain frame 42 parallel to frame 12 as it is raised and lowered. An elongate vertical shield plate 56 is secured to each side edge of the platform just inside the guard rails to cover the openings between the lower rails and prevent injury to the stock.

Support for the forward end of the ramp in working position is provided by the jack stands 20. A cross bar 58 is secured to the forward end of ramp platform 28 and extends out beyond each side. A generally vertically directed guide socket 60 is secured to each end of the cross bar and slidably receives an elongate support shank 62 provided with a ground engaging foot 64. The shanks are formed with a plurality of longitudinally spaced cross apertures 66 which may be selectively aligned with an aperture 68 in each socket to receive a locking pin 70 to retain the ramp in a desired position.

In order to carry out the functions of the apparatus, operating means are provided interconnecting the framework and the ramp to positively raise the ramp against gravity to a forwardly and upwardly inclined position when supported by the base and to positively raise the base against gravity upward toward the ramp when the latter is supported by the load platform of a transporting vehicle such as a pickup truck. In the presently preferred form of the invention separate mechanisms are provided for these two operations.

The mechanism for raising the ramp comprises a winch 72 having a winding drum 74, a crank 76, and a releasable latch 78, mounted on an upper portion of brace bar 16 at one side of the ramp, an anchorage 80 mounted in a corresponding position on the bar 16 at the other side of the ramp, and a flexible cable or strand 82 of steel or any other suitable material. A guide pulley 84 is mounted on each side rail 34 at the lower side edges of the ramp intermediate its ends and provided with a pulley guard 86. One end of cable 82 is secured to anchorage 80, the cable passes over the pulleys, and its other end is wrapped on winding drum 74. When it is desired to raise the ramp to any attitude with respect to the base as shown in FIGS. 1 to 4, the winch is operated to retract the cable and it is latched when the desired attitude is attained. Since the length of the base is greater than half the length of the ramp, the chute will be stable when it is not being used for loading or unloading. The length of the base may be from about 55 percent to about 70 percent of the length of the ramp and, as it is presently made, it is about 60 percent. These proportions provide for the portability of the chute as will be described.

After the ramp has been raised, the chute is prepared for use in loading or unloading stock by extending support shanks 62 until feet 64 contact the ground, and inserting locking pins 70. Latch 78 is then released and the cable is relaxed so that it is not subjected to any load during operation.

The second tension mechanism is used for raising the base with respect to the ramp at the end of the procedure for loading the chute on the transporting vehicle. It is similar in construction and operation to the first tension mechanism but in this case, as seen in FIG. 7, the winch 72 is mounted on the side rail or marginal edge 34 of the ramp and anchorage 80 is similarly mounted on the opposite side edge. Guide pulleys 84 are mounted on the inner sides of mountings 36, and are not shown. Cable 82 is connected in the same way between winch 72 and anchorage 80, passing over the guide pulleys. When the winch is operated to retract the cable, it will pull the base up toward the ramp.

As pointed out previously, the length of the base is more than half but substantially less than the full length of the ramp, and the forward end 88 of the base constitutes a fulcrum. Thus the base is long enough to prevent toppling of the chute when there is no extra load on the forward portion of the ramp. At the same time it is short enough to enable a man to tilt it forward about fulcrum 88 on occasion. When the ramp is to be raised to any desired extent, as in FIGS. 3 and 4, the second winch 72 is unlatched and the first winch 72 is operated to raise the ramp and then locked. After the jack stands are positioned it is unlatched as previously described.

When it is desired to transport the chute to a new location, the ramp is raised to a higher level as indicated in FIG. 4, the first winch 72 remains latched, and the jack stands are not extended. A truck 90 is backed into position as shown until its load bed or tail gate contacts the underside of the ramp. The chute is then tilted forward until the ramp rests in supported position on the load bed as illustrated in FIG. 5, and then is shoved forward to that support plate 92 slides along the bed of the truck. The connection of brace bar 16 to mounting 36 is at about one third of the length of the base forward of its aft end. Consequently it leaves a clear space well aft of the middle of the ramp so that when the ramp is tilted forward a major portion of its length will lie on the bed in stable position. The first winch is then unlatched.

The second tension mechanism now comes into play. Operation of second winch 72 pulls the base upward toward the loaded ramp, raising the fulcrum clear of the ground. The ramp may then be pushed forward farther onto the truck if it is not already occupying the full length of the load bed. Winch 72 may then be further actuated to pull the base up into forcible contact with the aft lower end of the body, which is the bumper 92, as illustrated in FIG. 6. The winch is then latched and the chute is secured on the truck for transport. When the truck arrives at the new location the chute is unloaded by reversing the steps just described.

It will be apparent that the apparatus disclosed provides a simple, easily operated, durable apparatus for loading and unloading stock, and a simple and very rapid method of transferring a loading chute to and from a transporting vehicle.

What is claimed is:

1. A portable stock loading chute comprising:
   a substantially rigid framework having an upright frame defining an upright transverse plane and a supporting base lying in a generally horizontal plane extending forward from the lower end of the frame for supporting engagement with the ground;
   the frame including a passageway for entry of stock;
   an elongate ramp pivotally connected at its aft end to the lower end of the frame adjacent to the base and extending forward from the frame;
   the ramp having a predetermined length and the base having a predetermined length more than half but substantially less than the full length of the ramp;
   and lockable and releasable operating means interconnecting the framework and the ramp to positively raise the ramp against gravity to a forwardly and upwardly inclined position when supported by the base, and to positively raise the base against gravity upward toward the ramp when the latter is supported by the load platform of a transporting vehicle having a lower aft portion.

2. A chute as claimed in claim 1; in which
   the forward end of the base is formed to constitute a fulcrum about which the ramp may be tilted forward to a generally horizontal position to lie on the load platform of the transporting vehicle.

3. A chute as claimed in claim 2; in which
   the operating means is actuatable to raise the base toward the ramp sufficiently to cause the fulcrum end of the base to clear the ground and to cause contact of the base with the lower aft portion of the vehicle body.

4. A chute as claimed in claim 1; in which
   the length of the base lies in the range of about 55 percent to about 70 percent of the length of the ramp.

5. A chute as claimed in claim 1; in which
   the length of the base is about 60 percent of the length of the ramp.

6. A chute as claimed in claim 1; in which
   the operating means comprises a first tension device operable to raise the ramp against gravity and releasable to allow it to lower by gravity, and a second tension device operable to raise the base against gravity and releasable to allow it to lower by gravity.

7. A chute as claimed in claim 6; in which
   the first tension device includes a winch mounted on the framework well above the base and a flexible strand extending between and engaging the winch and the ramp intermediate the ends of the ramp;
   one end of the strand being wrapped on the winch for retraction and extension.

8. A chute as claimed in claim 6; in which
   the first tension device includes a winch mounted on an upper portion of the framework at one side of the ramp;
   an anchorage mounted on an upper portion of the framework at the other side of the ramp;
   strand guides at the lower side edges of the ramp forward of its pivotal connection to the frame;
   and a flexible strand secured at one end to the anchorage, passing over the strand guides, and wrapped at its other end on the winch.

9. A chute as claimed in claim 6; in which
   the second tension device includes a winch mounted on the ramp forward of its pivotal connection to the frame and a flexible strand extending between and engaging the winch and the base intermediate the ends of the base;
   one end of the strand being wrapped on the winch for extension and retraction.

10. A chute as claimed in claim 6; in which
    the second tension device includes a winch mounted on one longitudinal side edge of the ramp forward of its pivotal connection to the frame;
    an anchorage mounted on the other longitudinal side edge of the ramp forward of its pivotal connection to the frame;
    strand guides at the sides of the base intermediate its ends;
    and a flexible strand secured at one end to the anchorage, passing over the guides, and wrapped on the winch.

11. A chute as claimed in claim 1; in which
    the frame comprises a pair of laterally spaced upright bars joined at their upper ends by a cross member and pivotally connected at their lower ends to the aft end of the ramp;
    the base comprises a pair of laterally spaced horizontally extending bars joined at their forward ends by a cross member and pivotally connected at their aft ends to the longitudinal side edges of the ramp forward of and adjacent to its pivotal connection to the frame;
    and a brace member extends forward and downward from each frame bar to its corresponding base bar and is connected pivotally at its ends to the frame bar and base bar respectively.

12. A chute as claimed in claim 1; in which
    a generally vertically directed guide socket provided with locking means is secured to each side of the forward portion of the ramp;
    and an elongate support shank is slidably mounted in each socket to be lowered into contact with the ground and to be secured in position to support the forward end of the ramp;
    the operating means being releasable to transfer the ramp load to the support shanks.

13. A method of transferring to the load platform of a transporting vehicle a stock loading chute having a supporting framework with a forwardly extending base defining a fulcrum at its forward end and an elongate ramp pivotally connected at its aft end to the lower aft end of the framework, comprising;
  positively applying tension between the ramp and the framework to elevate the ramp about its pivotal connection to an upwardly and forwardly inclined attitude with respect to the base and locking it in elevated position;
  moving the vehicle into loading position with its load platform underlying the forward portion of the ramp;
  tilting the ramp forward about the fulcrum of the base to cause the ramp to lie in supported position on the load platform;
  releasing the tension force on the ramp;
  and positively applying tension between the ramp and the base to raise the base toward the ramp and free the fulcrum from contact with the ground.

14. A method as claimed in claim 13; further including continuing to apply tension to bring the base into contact with the lower aft portion of the vehicle body, and locking the ramp in final position.

* * * * *